US007128322B2

(12) United States Patent
Novil et al.

(10) Patent No.: US 7,128,322 B2
(45) **Date of Patent: *Oct. 31, 2006**

(54) LIGHT COLORED CYLINDER HEAD GASKET AND METHOD OF PRODUCING

(75) Inventors: Martin Novil, Northville, MI (US); Jerry Gerstile Smith, Newport, TN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/649,430

(22) Filed: Aug. 27, 2003

(65) Prior Publication Data

US 2004/0046334 A1 Mar. 11, 2004

Related U.S. Application Data

(63) Continuation of application No. 10/280,568, filed on Oct. 25, 2002, now Pat. No. 6,945,538.

(51) Int. Cl.
*F02F 11/00* (2006.01)

(52) U.S. Cl. ........................ 277/592; 277/598; 277/600

(58) Field of Classification Search ........ 277/591–595, 277/598, 600
See application file for complete search history.

(56) References Cited

U.S. PATENT DOCUMENTS 3,770,480 A * 11/1973 Farnam ...................... 427/177
4,434,989 A * 3/1984 Beyer et al. ................ 277/592
4,648,607 A * 3/1987 Yamada et al. ............. 277/598
4,714,733 A * 12/1987 Itoh et al. .................. 524/493
4,849,295 A * 7/1989 Dickerman et al. ......... 428/457
5,004,650 A * 4/1991 Ashizawa et al. .......... 428/463
5,150,910 A * 9/1992 Udagawa .................... 277/592
5,277,434 A * 1/1994 Kestly et al. ............... 277/592
5,393,076 A * 2/1995 Hagiwara et al. ........... 277/592
5,490,681 A * 2/1996 Plunkett et al. ............. 277/592
5,639,103 A * 6/1997 Jeanne et al. ............... 277/596
5,932,645 A * 8/1999 Kawanaka et al. ......... 524/462
5,984,317 A * 11/1999 Grant-Acquah et al. .... 277/592
6,237,919 B1 * 5/2001 Grant-Acquah et al. .... 277/592
6,247,703 B1 * 6/2001 Forry et al. ................. 277/592
6,409,178 B1 * 6/2002 Raden et al. ............... 277/592
6,517,084 B1 * 2/2003 Inamura ..................... 277/592
6,620,871 B1 * 9/2003 Wilson, III ................. 524/398
6,779,801 B1 * 8/2004 Grant-Acquah et al. .... 277/592
6,787,221 B1 * 9/2004 Botrie et al. ............. 428/304.4
6,945,538 B1 * 9/2005 Novil et al. ................ 277/591

OTHER PUBLICATIONS

"The General Chemical Resistance of GYLON Gasketing Products", p. 1, Mar. 1986.*

* cited by examiner

*Primary Examiner*—Alison K. Pickard
(74) *Attorney, Agent, or Firm*—Ronald W. Wangerow; Harness, Dickey & Pierce, P.L.C.

(57) ABSTRACT

A cylinder head gasket is coated with an encapsulant that is mixed with a light color pigment to create a light colored encapsulant. A translucent topcoat is preferably coated over the encapsulant. The encapsulant is preferably an epoxy primer, the topcoat is preferably a silicone, and the pigment is preferably made from titanium dioxide or zinc oxide.

1 Claim, 2 Drawing Sheets

LIGHT COLORED CYLINDER HEAD GASKET AND METHOD OF PRODUCING

CROSS REFERENCE TO RELATED APPLICATIONS

This application is a continuation of U.S. patent application Ser. No. 10/280,568, filed Oct. 25, 2002, now U.S. Pat. No. 6,945,538.

BACKGROUND OF INVENTION

This invention relates in general to gaskets used to provide a seal between two parts, and more specifically to a cylinder head gasket that is made to be installed between a cylinder head and a cylinder block of an engine. This invention also relates to a method of producing a cylinder head gasket.

Cylinder head gaskets are typically formed from a flat piece of material through which holes are stamped or punched, forming a gasket body. The gasket body is typically a black or dark gray color. The smaller holes are made to align with coolant and oil passages in the engine cylinder block and head. Each of the larger holes surrounds one of the engine cylinder bores. An armor plate is then aligned with the larger holes from one side of the gasket body, with flanges extending through the holes to the other side. The flanges are then formed (bent down around the holes) in order to secure the armor to the gasket body to form the cylinder head gasket. The armor is typically made of metal and provides improved sealing properties around the cylinder bores.

There are drawbacks to the standard method of producing these gaskets that result in gaskets which may provide less long-life fluid sealing performance than is desired. For instance, during the stamping process, flakes of the gasket body material may break free and stick to the gasket body. And, other debris around the location where the gasket is being manufactured may also fall onto and stick to the gasket body. Since the flakes and much of the other debris may be the a similar dark color as the gasket body, the flakes and debris are not noticed during the next steps in the production process. When the armor plate is assembled to the gasket body, then, there is a chance of trapping the flakes or other debris between the armor and the gasket body. This is not desirable since the flakes or other debris trapped during the forming process can make the flange bend unevenly, which can potentially reduce the sealing effectiveness of the gasket.

Moreover, once in service, should a gasket need replacing—for example, during an engine re-build—the gasket body material generally used for cylinder head gaskets tends to stick to the surfaces of the cylinder block and head. This is undesirable and tends to increase the time for proper replacement of the cylinder head gasket needed to assure good long-life sealing performance.

Also, since the gasket body is made from a dark material, if one needs to analyze a gasket removed from a vehicle due to potentially poor sealing performance, it can be difficult to locate a fluid leak path. Locating a fluid leak path and analyzing its characteristics can help one to better determine a root cause of a gasket leak.

Thus, it is desirable to employ an improved method of producing a cylinder head gasket that will result in an improved gasket that overcomes the drawbacks noted above with cylinder head gaskets used to seal between and engine cylinder block and head.

SUMMARY OF INVENTION

In its embodiments, the present invention contemplates a cylinder head gasket that includes a body, being generally flat and having a first surface, a second surface, and at least one cylinder hole therethrough. An encapsulant generally coats the first surface, the second surface and a perimeter of the at least one cylinder hole, and a light colored pigment is intermixed with the encapsulant to thereby create a light color encapsulant.

The present invention further contemplates a method of producing a cylinder head gasket comprising the steps of: mixing a light colored pigment with an encapsulant to thereby create a light colored encapsulant that has a brightness above about 75 on a CIE L*A*B color and brightness rating system; and applying the encapsulant to coat substantially all of a first surface and a second surface of a gasket body.

An advantage of an embodiment of the present invention is that the cylinder head gaskets produced will have less likelihood of debris damaging the gasket during manufacturing. This will minimize the chances that a gasket will not provide long-life fluid sealing performance.

Another advantage of an embodiment of the present invention is that an encapsulant, such as an epoxy primer, is a generally hard coating, which will allow for proper assembly of the armor to the gasket body, while also not causing performance degradation of the gasket.

A further advantage of an embodiment of the present invention is that an encapsulant, such as epoxy primer, generally adheres to a gasket body better than some materials that are desirable for a topcoat, such as a silicone coating, while still providing good adherence of a topcoat to the encapsulant.

Still another advantage of an embodiment of the present invention is that the topcoat, such as a silicone coating, provides good fluid sealing characteristics between a cylinder block and cylinder head, while providing for easy removal of the gasket from the surfaces of the cylinder block and cylinder bore when being replaced, such as, for example, during an engine re-build.

An additional advantage of an embodiment of the present invention is that a light color pigment in an encapsulant will allow one to better evaluate leak paths for gaskets that may fail to completely seal properly.

A further advantage of an embodiment of the present invention is that a light color pigment in an encapsulant that is applied prior to assembly of armor to a gasket body will allow flakes and debris to be more easily seen and removed before the assembly of the armor to the gasket body.

DETAILED DESCRIPTION

Figure 1:
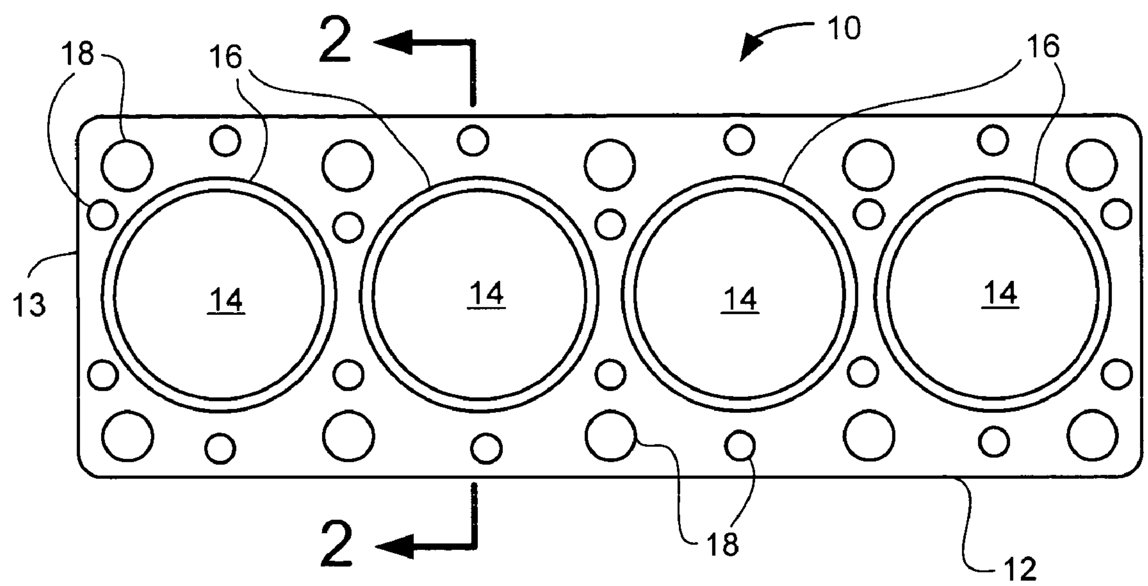
FIG. 1 is a top, schematic view of a cylinder head gasket according to this invention.
Figure 2:
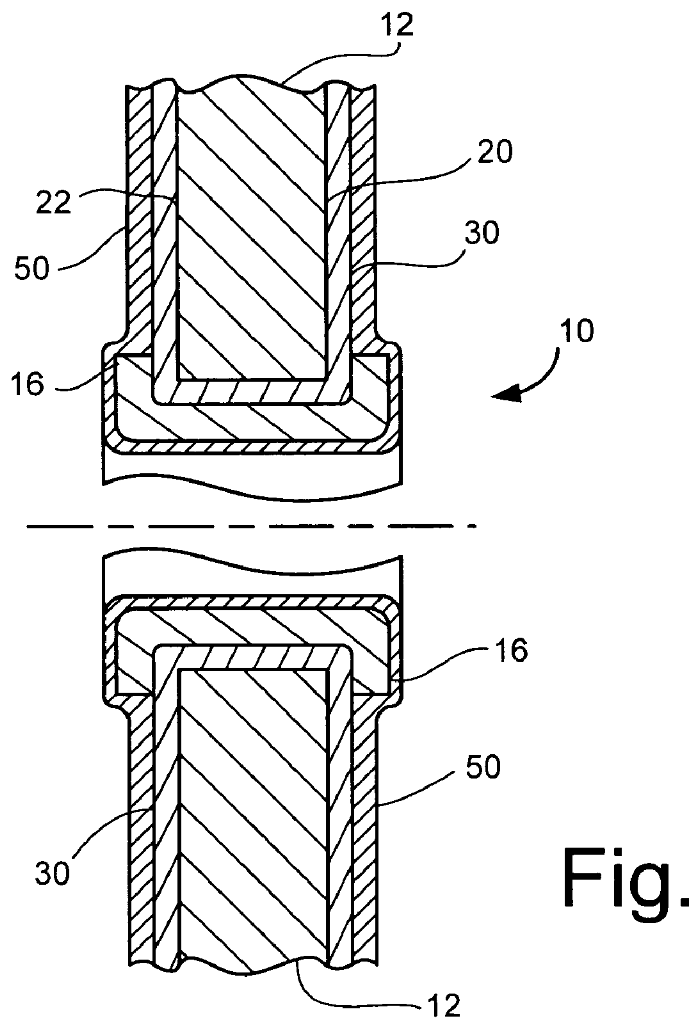
FIG. 2 is an enlarged, partial, sectional view of the cylinder head gasket taken along line 2—2 of FIG. 1.

FIGS. 1 and 2 illustrate a cylinder head gasket 10 (also referred to herein as "gasket") that is specifically designed for installation between a cylinder head (not shown) and a cylinder block (not shown) of an engine (not shown) in a well-known manner. The gasket 10 includes a gasket body 12, which has a perimeter 13 that is typically shaped to follow the perimeter of a cylinder head for the particular engine for which it will be used. The body 12 is preferably formed from graphite or a fiber composition. The fiber composition can include clay with reinforcing fibers, and small amounts of rubber and/or cellulose can also be included in the composition, if so desired. The body 12 may also be formed from other typical materials employed for cylinder head gaskets. The body 12 includes a first surface 20 and a second surface 22.

Relatively large cylinder holes 14 are provided through the body 12 to receive pistons (not shown) of the engine. A number of relatively small holes 18 are provided through the body 12 to permit the passage of coolant and oil. Preferably, the holes 14, 18 are stamped through a blank to form the desired configuration of the body 12.

The body 12 is then encapsulated (covered) with an encapsulant 30. Preferably, the encapsulant 30 is an epoxy primer or other similar coating material that will provide a hard enough surface to properly form armor around (discussed below), and will provide good adhesion to the surfaces 20, 22 of the gasket body 12 and to a topcoat (discussed below). The encapsulant 30 is preferably rolled on, but can also be applied by spraying or other conventional means of application. Preferably, the encapsulant 30 covers the entire first and second surfaces 20, 22, as well as the edges of holes 14, 18 stamped through the body 12. Also, preferably, the encapsulant 30 is applied in a coat that has a thickness less than approximately 0.001 inch. This encapsulant coating 30 reduces the potential for deterioration of the body 12 and reduces the potential for flakes and other debris to stick to the body 12 during subsequent processing and handling. A preferred encapsulant 30 is water based epoxy primer that has a composition of about ten to twenty five percent solids.

Armor 16 is provided about the circumference of the holes 14 as a reinforcement. The encapsulant 30 is coated on the body 12 prior to the installation of armor 16. The armor 16 is then assembled to the encapsulated gasket body 12.

After the armor 16 is assembled to the gasket body 12, a topcoat 50 is applied over the encapsulant 30 and armor 16. Preferably, the topcoat 50 is a silicone. A preferred silicone is one with a composition that is generally solvent free (one hundred percent solids) and platinum catalyst cured. Also, preferably, the topcoat 50 has a thickness ranging between approximately 0.001 to 0.002 inch. A silicone topcoat 50 provides good fluid sealing properties for the gasket 10 when installed between a cylinder block and head in an engine. The silicone topcoat 50 also provides a non-stick function. That is, if the cylinder head gasket 10 needs to be removed and replaced, the silicone topcoat 50 has a low tendency for portions of it to separate from the gasket 10 and stick to the cylinder block or head. Applying the topcoat 50 onto the encapsulant 30 rather than directly to the gasket body has the added advantage that the silicone topcoat 50 will generally adhere better to an epoxy primer encapsulant 30 than to gasket bodies having graphite or composition facings to which a topcoat is applied.

Figure 3:
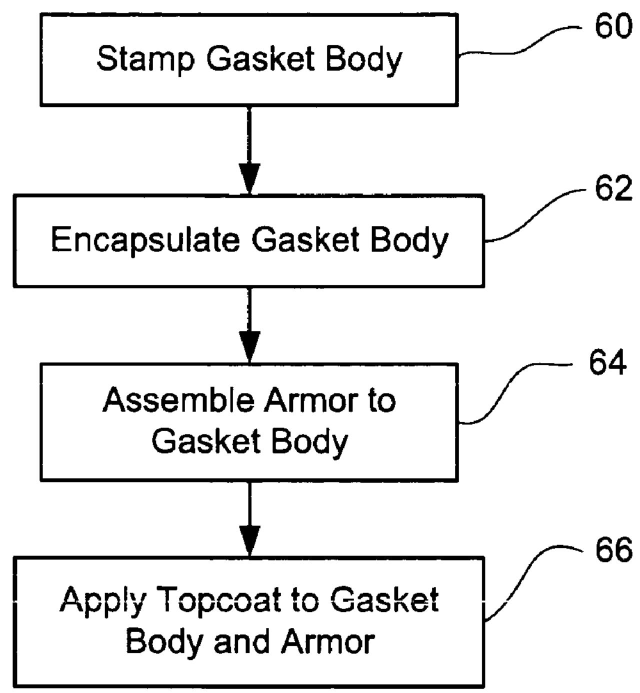
FIG. 3 is a flow diagram of the steps for producing a cylinder head gasket according to this invention.

As indicated in FIG. 3, with reference to FIGS. 1 and 2, a method of producing the gasket 10 includes at least four steps. The gasket body 12 is stamped from a blank in a generally known manner, block 60. The gasket body 12 is then encapsulated with the encapsulant 30, such as epoxy primer, block 62. After the gasket body 12 is encapsulated, the armor 16 is assembled to the encapsulated gasket body 12, block 64. And then, the topcoat 50, preferably silicone, is applied over the encapsulant 30 and armor 16, block 66.

The present gasket 10, as formed by the method described herein, provides advantages over prior art cylinder head gaskets. The encapsulant 30 minimizes damage that can be caused during manufacturing by flakes, other debris and handling, as well as reducing the likelihood of flakes and debris sticking to the body 12. The encapsulant 30 acts as a primer for the later topcoat 50. The encapsulant 30 can be applied under the armor 16 without sealing performance degradation. The non-stick function of the topcoat 50 eases engine disassembly and rebuilding by minimizing sticking. The topcoat 50 also provides good sealing characteristics.

Figure 4:
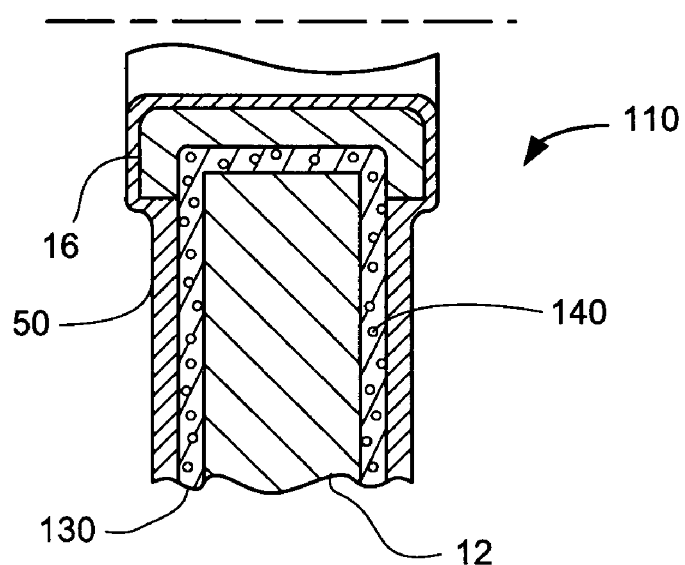
FIG. 4 is a sectional view similar to FIG. 2, but illustrating an alternate embodiment of the present invention.

FIG. 4 illustrates an alternate embodiment of the gasket 110 of the present invention. In this embodiment, a light color additive (or pigment) 140 is added to the encapsulant 130 prior to its application on the body 12. A preferred color additive 140 is titanium dioxide, which results in a white or whitish color encapsulant 130. Other preferred color additives (pigmentation solids), if so desired, may be, for example titanium dioxide and small amounts of PB15 (pigment blue 15) or, for example, PG7 (pigment green 7). Zinc oxide can also be used as a substitute for the titanium dioxide, if so desired. The preferred color additives 140 produce a light coloring to the encapsulant 130. By light coloring, it is meant to produce an encapsulant 130 with a light shade of a color, for example, with a brightness (L*) above 75, on a 0 to 100 scale using the CIE L*A*B* color and brightness rating system. The silicone topcoat 50 is generally translucent and so the color of the encapsulant 130 will show through.

A light colored encapsulant 130 will generally make it easier to see flakes or other debris that is on the encapsulant coated gasket body, thus allowing for removal of the flakes and debris before assembling the armor 16 to the encapsulated gasket body. Moreover by having the encapsulant 130 above this brightness level, it is easier for one to evaluate a used gasket 110 to determine a leak path along the surface of a gasket 110 that did not have a complete fluid tight seal. The color additive 140 also provides a distinctive and easily recognizable gasket 110.

While certain embodiments of the present invention have been described in detail, those familiar with the art to which this invention relates will recognize various alternative designs and embodiments for practicing the invention as defined by the following claims.

What is claimed is:

1. A cylinder head gasket comprising:

a body, being generally flat and having a first surface, a second surface, and at least one cylinder hole therethrough;

an encapsulant generally coating the first surface, the second surface and a perimeter of the at least one cylinder hole; and a light colored pigment intermixed with the encapsulant to thereby create a light color encapsulant that has a brightness above 75 on a CIE L*A*B color and brightness rating system;

said gasket further including an armor assembled to the body adjacent to the at least one cylinder hole; and a generally translucent topcoat generally coating the encapsulant and the armor.

* * * * *